Figure 1:
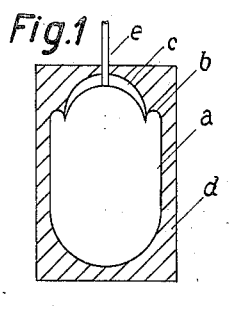
Figure 2:
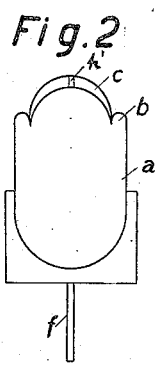

Sept. 22, 1925.  W. HODECKER  1,554,853
METHOD FOR THE PRODUCTION OF DOUBLE WALLED GLASS VESSELS
Filed March 7, 1924

INVENTOR:
W. Hodecker
By: Chatwin & Company
attys.

Patented Sept. 22, 1925.

1,554,853

UNITED STATES PATENT OFFICE.

WILHELM HODECKER, OF ILMENAU, THURINGEN, GERMANY.

METHOD FOR THE PRODUCTION OF DOUBLE-WALLED GLASS VESSELS.

Application filed March 7, 1924. Serial No. 697,641.

*To all whom it may concern:*

Be it known that I, WILHELM HODECKER, German citizen, and resident of Ilmenau, Thuringen, Germany, have invented new and useful Methods for the Production of Double-Walled Glass Vessels, of which the following is a specification.

Double walled glass vessels such as the so-called Dewar or vacuum flasks have heretofore generally been produced by placing two vessels one inside the other and then melting together of the necks and the formation of the bottom of the outer vessel effected by the glassworkers' blow-lamp. A large amount of work with the lamp on the part of the glass-blower is necessary for the completion of the vessel.

Other previously proposed methods for forming these vessels have consisted in blowing a balloon-shaped glass body with a thickened bottom which latter is afterwards forced upwardly by means of a former to provide the inner wall of the vessel, the enclosed air being allowed to escape freely or by suction. Such methods however possess the disadvantage that in shaping the inner wall not only is the thickened bottom stretched out as intended, but the rim which connects the outer and inner walls is also unavoidably stretched and strained and thereby the vessel is weakened at its most vulnerable spot. It is well known that such flasks must be handled with great care as shocks of any kind are liable to cause the whole inner and outer walls to break apart at the rim. On the other hand it is not practical to reinforce the vessel at the rim by special methods since not only is the manufacture complicated and the cost increased thereby but the insulating properties of the vessel are also impaired.

The object of the present invention is to provide a simple method whereby these disadvantages may be overcome and vessels very expeditiously produced which are neither strained at the rim nor unduly thickened. This object is attained according to the method now proposed chiefly by forming the complete semi-circular or doubled rim simultaneously with the outer walls of the vessel at the initial glass blowing operations, at the same time providing a dome-shaped portion thereon which subsequently forms the inner walls of the vessel. The forming of the outer walls and rim is effected by blowing in a mould which has a cooling action on these parts which therefore immediately take their final form and are not subsequently strained or deformed when removed from the mould or during the subsequent formation of the inner walls. The dome is depressed or shaped to form the inner walls by manipulation of the vessel in the tongs and by means of a tool or former rotated relatively to the vessel, said tool being preferably polygonal in cross section. It will be noted that no casting, cutting or joining operations are involved.

The method of producing such vessels is illustrated diagrammatically in the accompanying drawings, as applied to plain cylindrical vessels and to flasks. The treatment may be readily followed from these drawings.

For the production of cylindrical vessels the hollow glass body, which corresponds to the outer vessel in the finished article is blown in a mould, whereby is formed forthwith the upper neck rim of the finished vessel. As seen from Fig. 1, the hollow glass body $a$ has cylindrical portions provided with a shoulder $b$ which corresponds to the rim, and this is closed by a stout glass dome which will finally form the inner walls. After this glass body $a$ has been blown in a mould $d$, the bunting iron $e$ is removed and the blown body $a$ is secured at the bottom by tongs $f$.

Figure 3:
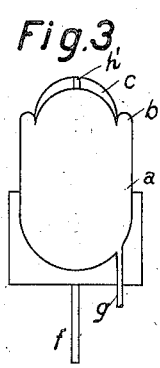
Figure 4:
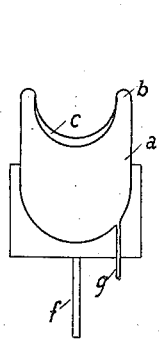
Figure 5:
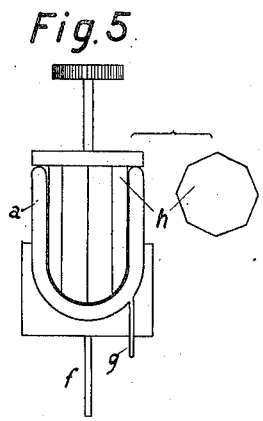

Then a narrow tube $g$ (Fig. 3) is added in known manner to the lower part to serve later as the evacuation nipple. If desirable the dome $c$ may be further heated in the furnace thus closing the blow-pipe opening $h^1$ left in the dome which may then sink. By manipulation of the vessel by means of the tongs $f$ the dome $c$ (Fig. 4) is caused to sink and is completed, as shown in Fig. 5, by means of a core or former $h$ which may be of polygonal cross section and is preferably rotated about its axis in use. The former $h$ may however be held stationary and the rotative movement given to the object being formed.

Figure 6:
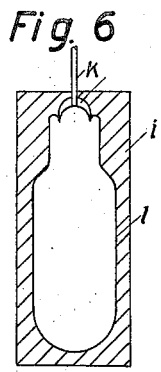
Figure 7:
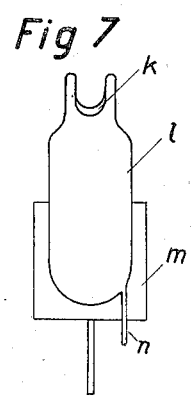
Figure 8:
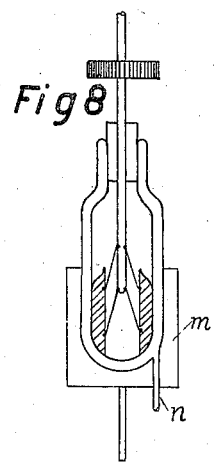

In Figs. 6 to 8 is represented the production of a double walled flask or vessel having a neck or reduced portion. In this case also the hollow glass body $l$ corresponding to the outer walls of the vessel is first blown in a mould $i$, and as before a dome $k$ is produced which serves to form the inner body. After the preliminary blowing the flask body $l$ is taken in the tongs $m$ and the dome $k$ allowed to sink in (Fig. 7). Thereafter the dome is pressed sufficiently within the vessel *l* and by the application of a mandril is fashioned into the inner walls of vessel, which should also consist of a wide body portion and a narrower neck portion. This is achieved by the use of a device which, after being inserted to a desired depth within the inner portion may be caused to spread outwardly and thereby effects the required widening. Naturally during this expansion either the device or the vessel should also rotate about its axis. The expanding device employed may be of known construction, as for example, a conical type of expander, or a scissor-like device sometimes known as "Nurnberg shears".

An additional advantage of this method is that the rim of the neck portion is considerably stronger than that of the vessel produced by blowing as formerly. Moreover the straining in the neck and body portions set up by the further working with the blow-lamp which has hitherto contributed to the ready breakage of this kind of vessel is obviated, and furthermore the vessel walls may be made of any desired thickness, which is not possible with the lamp-worked vessels.

I claim:

1. A method for producing double walled glass vessels, vacuum flasks and the like, by blowing in a mould a hollow glass body to the shape of the finished outer walls of the vessel including the complete doubled rim of the vessel and providing a dome portion thereon which subsequently forms the inner walls of the vessel.

2. A method for producing double walled glass vessels, vacuum flasks and the like, by blowing in a mould a hollow glass body to the shape of the finished outer walls including the complete doubled rim of the vessel and providing a dome portion thereon which subsequently is depressed and shaped to form the inner walls of the vessel by means of a tool rotated relatively to the vessel.

3. A method for producing double walled glass vessels, vacuum flasks and the like, by blowing in a mould a hollow glass body to the shape of the finished outer walls including the complete doubled rim of the vessel and providing a dome portion thereon which subsequently is depressed and shaped to form the inner walls of the vessel by means of a tool of polygonal cross section rotated relatively to the vessel.

4. A method for producing double walled glass vessels, vacuum flasks and the like, whereof the inner walls constitute an enlarged body portion and a narrower neck portion, by blowing in a mould a hollow glass body to the shape of the finished outer walls including the complete doubled rim of the vessel and providing a dome portion thereon which subsequently is depressed and is shaped to form the inner walls of the vessel by means of a tool which is capable of expansion as desired for the formation of said enlarged portion.

WILHELM HODECKER.